(12) United States Patent
Tadmor et al.

(10) Patent No.: US 12,316,990 B2
(45) Date of Patent: *May 27, 2025

(54) IMAGING SYSTEM WITH TIME-OF-FLIGHT SENSING

(71) Applicant: SEMICONDUCTOR COMPONENTS INDUSTRIES, LLC, Scottsdale, AZ (US)

(72) Inventors: Erez Tadmor, Atlit (IL); Tomas Geurts, Haasrode (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/349,380

(22) Filed: Jul. 10, 2023

(65) Prior Publication Data

US 2023/0353901 A1 Nov. 2, 2023

Related U.S. Application Data

(63) Continuation of application No. 17/247,522, filed on Dec. 15, 2020, now Pat. No. 11,743,616.
(Continued)

(51) Int. Cl.
*H04N 25/75* (2023.01)
*H04N 25/771* (2023.01)

(52) U.S. Cl.
CPC .......... *H04N 25/75* (2023.01); *H04N 25/771* (2023.01)

(58) Field of Classification Search
CPC ...... H04N 25/75; H04N 25/771; H04N 25/76; H04N 25/78; G01S 7/4863; G01S 7/487; G01S 17/894
See application file for complete search history.

(56) References Cited

U.S. PATENT DOCUMENTS

| | | | |
|---|---|---|---|
| 11,743,616 B2 * | 8/2023 | Tadmor | H04N 25/771 348/308 |
| 2012/0312967 A1 | 12/2012 | De Witt et al. | |

(Continued)

FOREIGN PATENT DOCUMENTS

DE 102012223295 A1 6/2014

OTHER PUBLICATIONS

C. S. Bamji et al., "1Mpixel 65nm BSI 320MHz demodulated TOF Image sensor with 3μm global shutter pixels and analog binning," 2018 IEEE International Solid-State Circuits Conference—(ISSCC), San Francisco, CA, 2018, pp. 94-96.
(Continued)

*Primary Examiner* — Kelly L Jerabek
(74) *Attorney, Agent, or Firm* — Treyz Law Group, P.C.; Tianyi He

(57) ABSTRACT

A time-of-flight (TOF) sensing system may include an illumination module and a sensor module. The sensor module may include an array of sensor pixels, pixel-level readout circuitry, and column-level readout circuitry coupled to the pixel-level readout circuitry via corresponding column lines. Pixel-level readout circuitry may be provided on a per-pixel basis (e.g., dedicated or unshared per-pixel readout circuitry may be provided for each pixel). Pixel-level readout circuitry may include one or more correlated double sampling stages and a storage stage. The storage stage may include a set of capacitors each configured to store different phase data generated by a corresponding pixel for a TOF sensing operation.

20 Claims, 7 Drawing Sheets

Related U.S. Application Data

(60) Provisional application No. 63/015,762, filed on Apr. 27, 2020.

(56) References Cited

U.S. PATENT DOCUMENTS

| | | |
|---|---|---|
| 2013/0235160 A1 | 9/2013 | Cohen et al. |
| 2015/0109414 A1 | 4/2015 | Adam et al. |
| 2018/0103222 A1 | 4/2018 | Yan |
| 2019/0181169 A1 | 6/2019 | Tadmor et al. |
| 2019/0339392 A1 | 11/2019 | Manabe et al. |
| 2020/0007850 A1 | 1/2020 | Nieuwenhove et al. |
| 2021/0075986 A1 | 3/2021 | Panicacci |
| 2021/0352234 A1 | 11/2021 | Padmanabhan et al. |

OTHER PUBLICATIONS

C. S. Bamji et al., "A 0.13 μm CMOS System-on-Chip for a 512×424 Time-of-Flight Image Sensor With Multi-Frequency Photo-Demodulation up to 130 MHz and 2 GS/s ADC." IEEE Journal of Solid-State Circuits 50 (2015): 303-319.

Y. Shirakawa et al., "An 8-Tap CMOS Lock-In Pixel Image Sensor for Short-Pulse Time-of-Flight Measurements." Sensors, Feb. 14, 2020, 20, 1040.

Y. De Wit et al., "A Low Noise Low Power Global Shutter CMOS Pixel Having Single Readout Capability And Good Shutter Efficiency." 2011 International Image Sensor Workshop, Jun. 11, 2011, R54, Japan.

\* cited by examiner

IMAGING SYSTEM WITH TIME-OF-FLIGHT SENSING

This application is a continuation of U.S. non-provisional patent application Ser. No. 17/247,522, filed on Dec. 15, 2020, which claims the benefit of U.S. provisional patent application No. 63/015,762, filed on Apr. 27, 2020. These applications are incorporated by reference herein in their entireties.

BACKGROUND

This relates generally to imaging systems and more specifically to camera modules having time-of-flight (TOF) sensing capabilities.

A typical TOF sensor includes an illumination module and a sensor module. The illumination module emits light onto an image scene having one or more objects. The emitted light reflects off of the one or more objects and is received by pixels in the sensor module to generate corresponding electrical charge. Based on the received light (e.g., the generated electrical charge), the sensor module can perform time-of-flight sensing calculations or operations to determine depth and other scene information.

In the illustrative example of indirect TOF sensing, the sensor module often requires the outputting of multiple image frames of raw data over time that are useable in combination to perform a single indirect TOF sensing operation. As such, this can require multiple frame buffers (e.g., one for each of the multiple image frames) at the readout circuitry. Additionally, since the exposure time period and the readout time period for each of these image frames are split across time, significant motion artifacts can be introduced. Furthermore, since the exposure time period and the readout time period for each of these image frames occur sequentially, high-speed interfaces for control and readout are needed and readout times are constrained in order to more satisfactorily and efficiently capture data for all of these image frames. These issues and constraints can undesirably increase system complexity and increase system costs, while still delivering unsatisfactory performance.

It is within this context that the embodiments herein arise.

DETAILED DESCRIPTION

Electronic systems such as digital cameras, computers, cellular telephones, automotive systems, and other electronic systems may include imaging systems or modules that gather light (photons) to capture one or more images (one or more image frames) that include information about their surrounding environments (e.g., the image scenes). The imaging system may have sensor circuitry including one or more arrays of image sensor pixels (sometimes referred to herein as sensor pixels or pixels). The active pixels in the array may include photosensitive elements such as pinned photodiodes that convert the incoming light into electric charge. The array may have any number of pixels (e.g., hundreds or thousands or more). Sensor circuitry may include control circuitry such as circuitry for controlling the pixels and readout circuitry for reading out image signals corresponding to the electric charge generated by the photosensitive elements.

Figure 1:
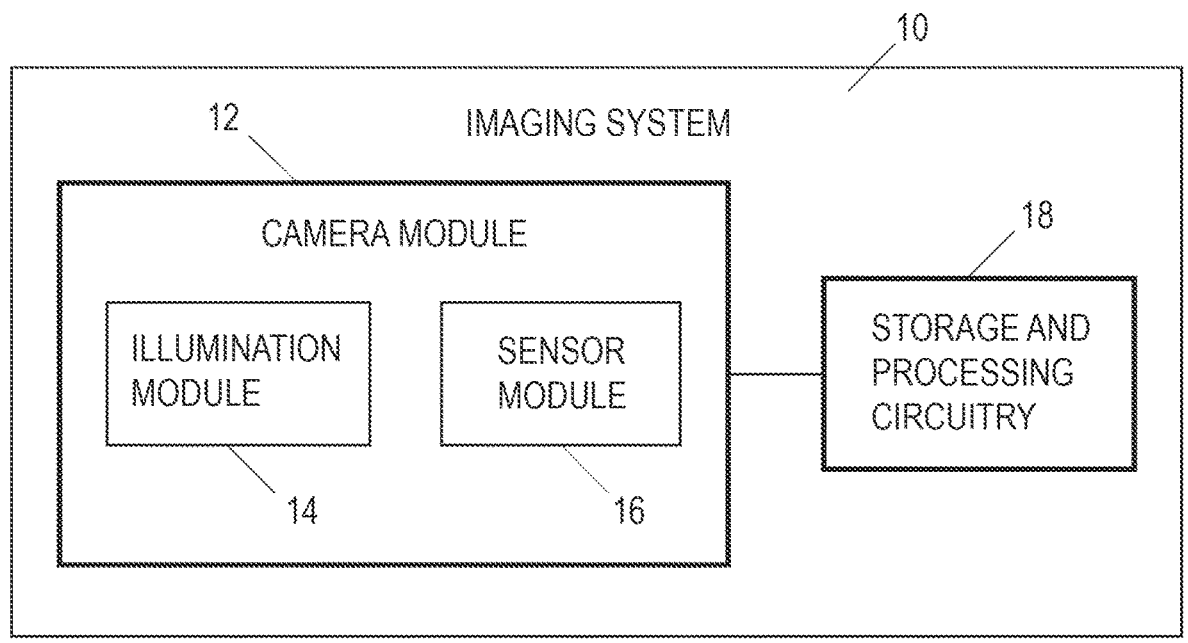
FIG. 1 is a block diagram of an illustrative imaging system having a time-of-flight sensor in accordance with some embodiments.

FIG. 1 is a diagram of an illustrative imaging system such as an electronic device that uses sensor circuitry (sometimes referred to herein as a sensor module) to capture images. Imaging system 10 of FIG. 1 may be a stand-alone camera, a cellular telephone, a tablet computer, a webcam, a video camera, a video surveillance system, an automotive imaging system, a video gaming system with imaging capabilities, an augmented reality and/or virtual reality system, an unmanned aerial vehicle system (e.g., a drone), an industrial system, or any other desired imaging system or device that captures image data. Camera module 12 (sometimes referred to as an imaging module) may be used to convert incoming light into digital image data. Camera module 12 may one or more corresponding sensor modules 16 (sometimes referred to as image sensor modules or image sensors). During image capture operations, light from a scene may be focused onto sensor module 16 by one or more corresponding lenses. Sensor module 16 may include circuitry for generating analog pixel image signals and circuitry for converting analog pixel image signals into corresponding digital image data, as examples. The digital image data may be provided to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12. When storage and processing circuitry 18 is implemented on different integrated circuits than those implementing camera module 12, the integrated circuits with circuitry 18 may be vertically stacked or packaged with the integrated circuits for camera module 12. Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

In some illustrative configurations described herein as examples, camera module 12 may implement a time-of-flight (TOF) sensor or camera. In these configurations, camera module 12 may include illumination module 14 configured to emit light for illuminating an image scene (e.g., one or more objects in the image scene), and sensor module 16 may be configured to gather reflected versions of the emitted light and to generate TOF information for the image scene (e.g., depth or distance information for one or more of the objects, a depth or distance map of the image scene, an image of the image scene, other information indicative of TOF information, etc.).

Figure 2:
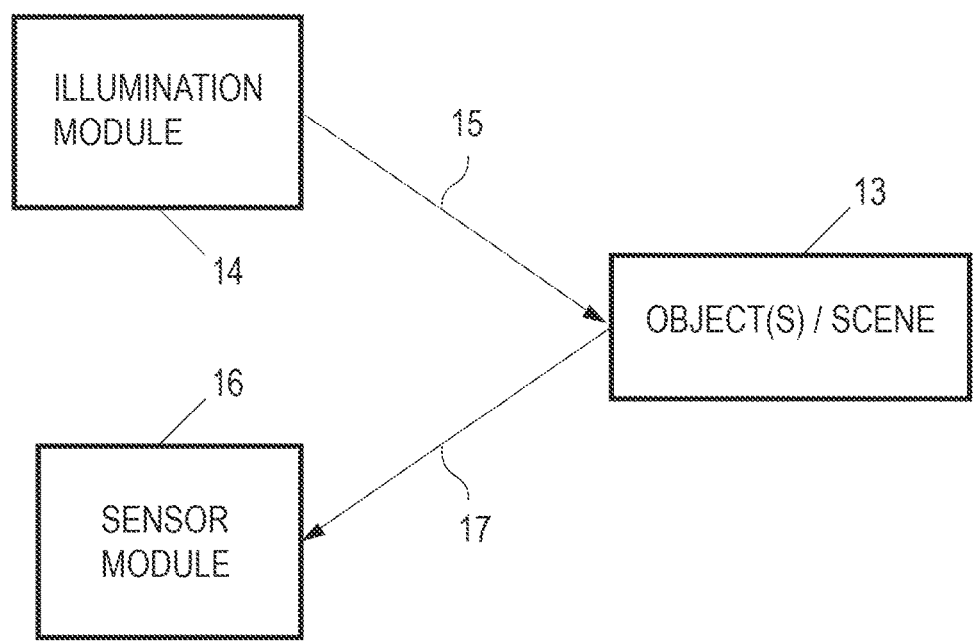
FIG. 2 is a block diagram of light emitted from an illumination module and light reflected from one or more objects that is collected by a sensor module in accordance with some embodiments.

FIG. 2 is an illustrative diagram showing how illumination module 14 may emit light and how sensor module 16 may receive the corresponding reflected light (e.g., the emitted light after reflecting off of one or more objects). As shown in FIG. 2, illumination module 14 may include one or more light emitters (sometimes referred to herein as one or more light sources or one or more illumination sources) coupled to driver circuitry and/or controller circuitry for controlling and driving the one or more light emitters. The light emitters may be implemented using and may include one or more light emitting diodes (LEDs), one or more laser diodes, one or more lasers, and/or one or more of other suitable light or illumination sources.

Illumination module 14 (e.g., a light emitter controlled by the driver circuitry) may emit light 15 having any suitable characteristics (e.g., any suitable waveform, any suitable peak amplitude or power, any suitable periodicity or frequency, pulses of light, light with a modulated amplitude and a modulation frequency, etc.). Light 15 may reach one or more objects 13 in an image scene and reflect off one or more objects 13 as reflected light 17. Objects 13 may include any suitable objects, inanimate or animate.

Reflected light 17 may be received at sensor module 16 (e.g., at one or more active image pixels in sensor module 16, at one or more photosensitive elements in the active image pixels, etc.). Driver circuitry and/or control circuitry may control the pixels in sensor module 16 to generate one or more image frames based on reflected light 17 (e.g., by providing control signals coupled to transistors or other actuated elements in the pixels). In particular, based on the received control signals from the driver circuitry and/or control circuitry, the pixels may generate different portions of charge in response to reflected light 17 (e.g., during an integration or exposure time period), may perform readout operations on the generated portions of charge (e.g., during a readout time period), and may perform other suitable operations during other time periods.

In configurations where illumination module 14 and sensor module 16 operate in an indirect TOF sensing scheme, processing circuitry for the TOF sensor (e.g., coupled to sensor module 16) may use a phase difference between emitted light signal 15 and reflected light signal 17 (collected by sensor module 16) to determine (e.g., calculate) TOF information for the scene during a TOF sensing operation. In particular, the TOF sensor (e.g., processing circuitry in camera module 12 or processing circuitry in imaging system 10) may control illumination module 14 and therefore know the characteristics of emitted light signal 15, and may control sensor module 16 to generate image signals (for multiple image frames), which are indicative of the characteristics of reflected light signal 17. The TOF sensor may process (e.g., compare and correlate) the generated image signals for the multiple image frames to reflected light signal 17 and to emitted light signal 15 to determine the phase difference and the TOF information.

The TOF sensor in FIG. 2 is merely illustrative. Illumination module 14 and sensor module 16 may each include any suitable circuitry (e.g., power supply circuitry, processing circuitry, control circuitry, readout circuitry, timing circuitry, clock circuitry, etc.). While illumination module 14 and sensor module 16 are shown as completely separate modules in FIG. 2 (and in FIG. 1), this is merely illustrative. If desired, illumination module 14 and sensor module 16 may be coupled to and include shared circuitry in the camera module system (e.g., power supply circuitry, clock generation circuitry, a timing controller, signal generator circuitry, control circuitry, storage circuitry, etc.), and may operate in close connection with each other.

Figure 3:
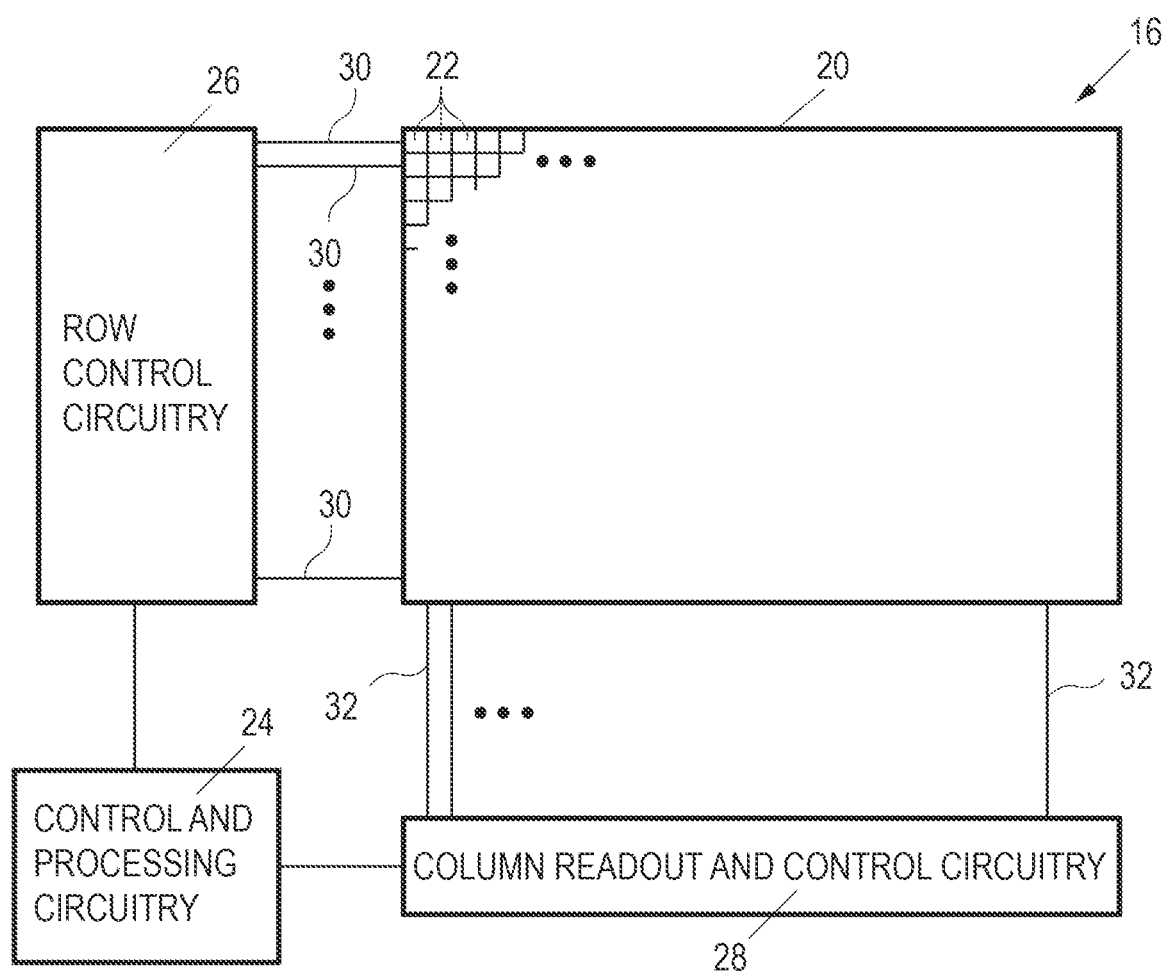
FIG. 3 is a block diagram of illustrative sensor circuitry having a pixel array and corresponding control and readout circuitry in accordance with some embodiments.

FIG. 3 is a diagram of an illustrative configuration for sensor module 16 (e.g., in FIGS. 1 and 2). As shown in FIG. 3, sensor module 16 may include a pixel array 20 containing sensor pixels 22 arranged in rows and columns and control and processing circuitry 24. Array 20 may contain, for example, tens, hundreds, or thousands of rows and columns of sensor pixels 22. Control circuitry 24 may be coupled to row control circuitry 26 or generally pixel control circuitry 26 (sometimes referred to as row driver circuitry or pixel driver circuitry) and column readout and control circuitry 28 or generally pixel readout circuitry 28 (sometimes referred to as column readout circuitry or column control circuitry, readout circuitry, or column decoder circuitry). Control circuitry 26 may receive (row) addresses from control circuitry 24 and supply corresponding (row) control signals such as reset, anti-blooming, row select (or pixel select), modulation, storage, charge transfer, readout, sample-and-hold, and store control signals to pixels 22 over (row) control paths 30.

One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. Readout circuitry 28 may receive image signals (e.g., analog pixel values generated by pixels 22) over lines 32. Readout circuitry 28 may include memory circuitry for storing calibration signals (e.g., reset level signals, reference level signals) and/or image signals (e.g., image level signals) read out from array 20, amplifier circuitry or a multiplier circuit, analog to digital conversion (ADC) circuitry, bias circuitry, latch circuitry for selectively enabling or disabling the portions (columns) of readout circuitry 28, or other circuitry that is coupled to one or more pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Readout circuitry 28 may supply digital pixel data to control and processing circuitry 24 and/or processor 18 (FIG. 1) for pixels 22 (e.g., in one or more pixel columns).

If desired, pixel array 20 may also be provided with a filter array having multiple (color) filter elements (each corresponding to a respective pixel) which allows a single image sensor to sample light of different colors or sets of wavelengths. In general, filter elements of any desired color and/or wavelength (e.g., infrared wavelengths) and in any desired pattern may be formed over any desired number of image pixels 22. In the illustrative example of time-of-flight sensing using an illumination source (e.g., in illumination module 14 in FIGS. 1 and 2), pixel array 20 may be provided with a correspond filter array that passes light having colors and/or frequencies emitted from the illumination source.

Sensor module 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices technology. Image pixels 22 may be frontside illumination (FSI) image pixels or backside illumination (BSI) image pixels. If desired, array 20 may include pixels 22 of different types such as active pixels, optically shielded pixels, reference pixels, etc. If desired, sensor module 16 may include an integrated circuit package or other structure in which multiple integrated circuit substrate layers (e.g., from multiple wafers) or chips are vertically stacked with respect to each other.

Configurations in which a TOF sensor is configured to perform indirect TOF measurements based on a phase difference between an emitted light signal (e.g., emitted by an illumination module 14) and the reflected light signal from an object in an image scene (e.g., received by a sensor module) are described herein as illustrative examples. In these configurations, the TOF sensor may use each pixel in the array of pixels to gather multiple image signals associated with a corresponding set of image frames in order to perform an (indirect) TOF sensing operation. In particular, each pixel may generate image charge in response to incident reflected light signal at different phases and/or different frequencies (e.g., light source modulation frequencies and/or sensor modulation frequencies). The generated image charge for each pixel is readout to construct the corresponding image frames associated with the different phases and/or different frequencies. Processing circuitry in the TOF sensor may subsequently process the image frames associated with the different phases and/or different frequencies to identify (e.g., generate) the TOF information such as object depth or distance information for the scene (e.g., based on the phase difference between the emitted light signal and the reflected light signal gathered by the sensor module).

Figure 4:
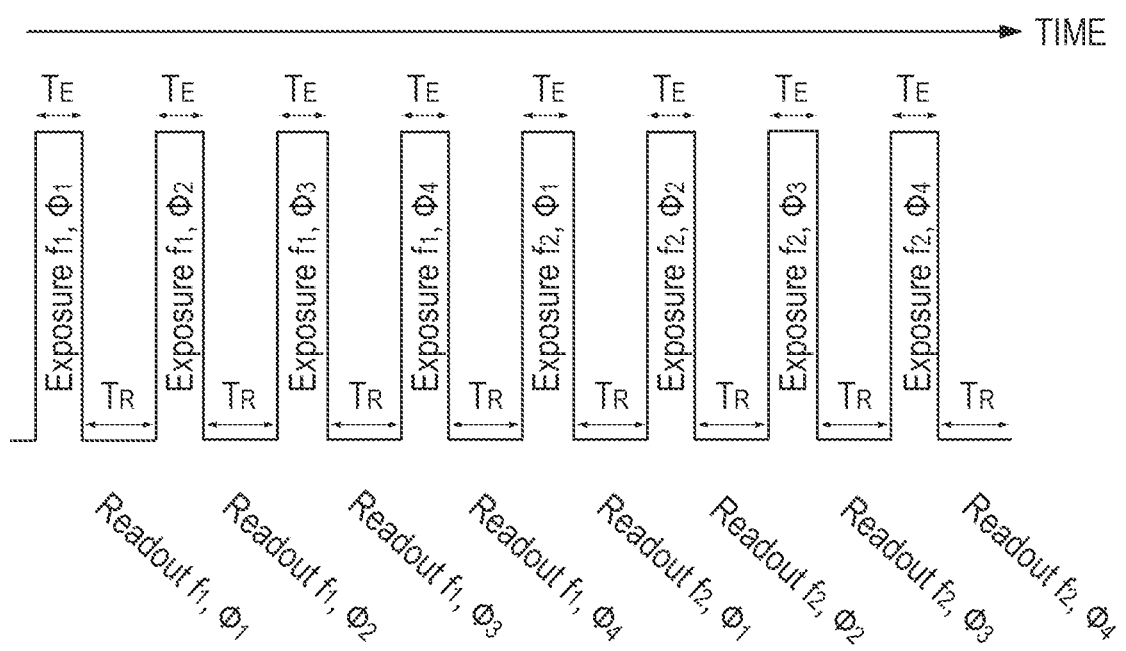
FIG. 4 is a timing diagram showing each exposure time period for a given image frame immediately followed by the corresponding readout time period in accordance with some embodiments.

FIG. 4 is an illustrative timing diagram of showing how pixels in a pixel array may be operated during corresponding exposure and readout time periods for different sets of image frames associated with a single TOF sensing operation. In the example of FIG. 4, a TOF sensor may operate using two modulation frequencies $f_1$ and $f_2$ (e.g., frequencies associated with the light emitted by an illumination module, sensor modulation frequencies associated with the how image charge is separated in pixels in the pixel array of a sensor module, etc.) and may gather image data at four different phases $\phi_1$, $\phi_2$, $\phi_3$, and $\phi_4$ for each of the two different frequencies $f_1$ and $f_2$ (e.g., using eight different frames).

As shown in FIG. 4, the TOF sensor may generate each image frame associated with one of frequencies $f_1$ or $f_2$, and one of phases $\phi_1$, $\phi_2$, $\phi_3$, and $\phi_4$ using a corresponding exposure time period $T_E$, during which each pixel gathers, separates, and stores image charge(s), and using a corresponding readout time period $T_R$, during which column readout circuitry performs readout operation(s) on stored image charge(s) from each pixel. In the operating scheme of FIG. 4, the exposure time period for an image frame may immediately be followed by the readout time period for that image frame, and only therefore thereafter (after the previous readout time period) does the exposure time period for the subsequent image frame occur.

Referring to the example of FIG. 4, the first exposure time period $T_E$ for the image frame associated with frequency $f_1$ and phase 41 is immediate followed by the first readout time period $T_R$ for the image frame associated with frequency $f_1$ and phase $\phi_1$. The second exposure time period $T_E$ for the image frame associated with frequency $f_1$ and phase $\phi_2$ may follow the first readout time period $T_R$ for the associated with frequency $f_1$ and phase $\phi_1$. Based on this pattern, the TOF sensor may generated the different image frames to perform the TOF sensing operation.

However, the TOF sensor configured to operate in this manner (as shown in FIG. 4) undesirably requires multiple frame buffers at the column readout circuitry (e.g., eight frame buffers at the column readout circuitry). Additionally, in an attempt to efficiently transfer each of the frames between pixel circuitry and the column readout circuitry, the TOF sensor may be required to include high speed interfaces and enforce restrictive readout timing, which may be undesirable in some applications. Beyond the undesirable introduction of these additional circuitry, because the exposure time period for each of these image frames are split across time (as necessitated by each of intervening readout time periods therebetween), significant motion artifacts can also be introduced.

Figure 5:
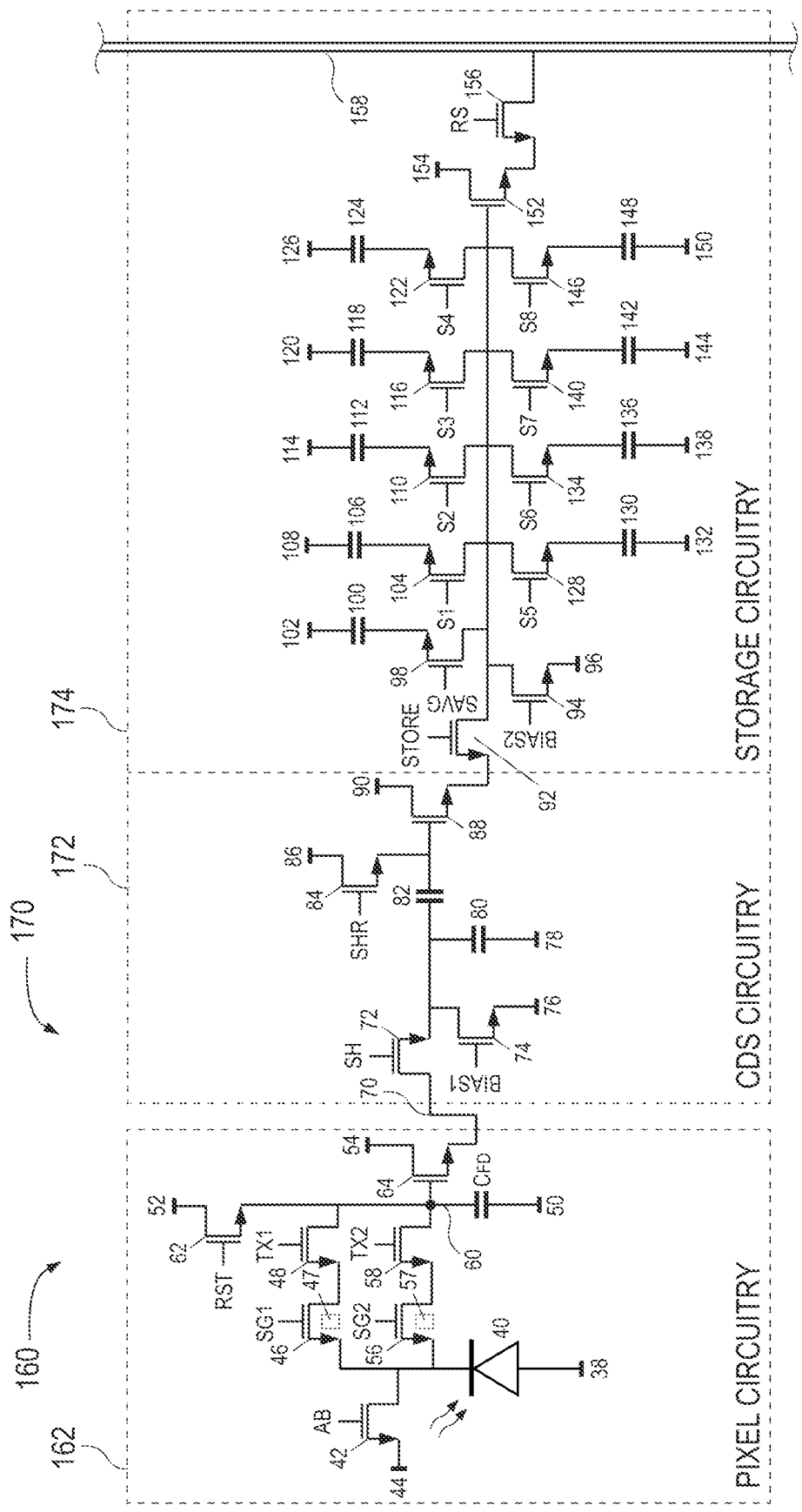
FIG. 5 is a circuit diagram of an image sensor module having pixel-level sampling and storage circuitry in accordance with some embodiments.

It would therefore be advantageous to provide a TOF sensing system that mitigate these issues. FIG. 5 is a circuit diagram of illustrative pixel circuitry and pixel-level readout circuitry that may be incorporated into sensor module 16 in FIGS. 1-3 (e.g., in TOF sensor 12 in FIG. 1) to mitigate the above-mentioned issues. In particular, each pixel 22 (e.g., each lock-in pixel) in FIG. 3 may implement pixel circuitry 162 in FIG. 5 that is coupled to dedicated pixel-level correlated double sampling (CDS) circuitry 172 and dedicated pixel-level storage circuitry 174 (sometime referred to herein collectively as pixel-level readout circuitry). While, in FIG. 3, array 20 is shown to be directly coupled to column readout circuitry 28, pixel-level readout circuitry (not explicitly shown in FIG. 3) may in fact be provided in an intervening manner between each pixel 22 and column readout circuitry 28.

In other words, each pixel 22 may be coupled to its own corresponding pixel-level readout circuitry, and through the corresponding pixel-level readout circuitry, may be coupled to other readout circuitry such as column readout circuitry (e.g., column readout circuitry 28 in FIG. 3). Readout circuitry may be described herein to include column-level or column readout circuitry (e.g., readout circuitry 28 in FIG. 3) coupled to columns of pixels 22 via column lines 32 and to include pixel-level readout circuitry (e.g., that include dedicated CDS circuitry and dedicated storage circuitry coupled to each pixel in a per-pixel manner instead of a per-column manner associated with column readout circuitry).

As shown in FIG. 5, pixel circuitry 162 (e.g., each pixel 22 in FIG. 3) may include photosensitive element 40 (e.g., photodiode 40). Photodiode 40 may receive incident light over a period of time (e.g., an integration time period) and may generate electric charge based on the incident light. A first terminal of photodiode 40 may be coupled to a voltage terminal 38 such as a ground voltage source. An anti-blooming transistor 42 may couple photodiode 40 (e.g., a second terminal of photodiode 40) to a voltage terminal 44 such as a supply voltage source. Transistor 42 may be configured to prevent blooming at photodiode 40 and/or may serve to keep photodiode 40 at a reset voltage level (e.g., the supply voltage level). As an example, when control signal AB is asserted (e.g., at a logic high to turn on transistor 42), photodiode 40 may be reset to the supply voltage level. When control signal AB is deasserted (e.g., at a logic low to turn off transistor 42), photodiode 40 may begin to accumulate charge in response to incident light.

Pixel circuitry 162 may include (local) charge storage regions such as storage gates 46 and 56. As an example, each storage gate may include a corresponding adjustable charge transfer barrier portion and a corresponding charge storage portion (e.g., charge storage region 47 for storage gate 46, and charge storage region 57 for storage gate 56) over which the gate terminal is formed. In other words, control signals SG1 and SG2 may be adjusted to control the flow of charge from photodiode 40 into charge storage regions 47 and 57, respectively. The use of storage gates in pixel circuitry 162 is merely illustrative. If desired, any suitable types of charge storage regions may be used in pixel circuitry 162.

If desired, two additional respective modulation transistors may each couple photodiode 40 to a corresponding storage gate. Modulated control signals (e.g., control signals for the modulation transistor and control signals SG1 an SG2) may be used to selectively transfer charge generated by photodiode 40 to only one of storage gates 46 or 56 at a given time during an exposure time period. As an example, the modulated control signals for access storage gates 46 and 56 may be inverted versions of each other during the exposure time period.

Pixel circuitry 162 may include floating diffusion region 60 having an associated charge storage capacity (e.g., having capacitance CFD relative to voltage terminal 50). As an example, floating diffusion region 60 may be implemented as a doped semiconductor region (e.g., a region in a silicon substrate that is doped by ion plantation, impurity diffusion, or other doping processes). Storage gates 46 and 56 may temporarily store (portions of) image charge generated at photodiode 40 prior to transferring the stored portions of image charge to floating diffusion region 60 for readout.

Transfer transistors 48 and 58 may respectively couple storage gates 46 and 56 to floating diffusion region 60. During readout operations, each transfer transistor (when activated by control signals TX1 or TX2) may transfer a charge portion stored at the corresponding storage gate to floating diffusion region 60 for readout. A reset transistor 62 may couple floating diffusion region 60 to a voltage terminal 52 such as a supply voltage source. As an example, when control signal RST is asserted, floating diffusion region 60 may be reset to a reset voltage level (e.g., the supply voltage level). If desired, transistor 62 (in combination with other transistors) may be used to reset other portions of pixel circuitry 162 (e.g., storage gates 46 and 56 using transistors 48 and 58) to the reset voltage level.

Pixel circuitry 162 may include source follower transistor 64. Source follower transistor 64 has a gate terminal coupled to floating diffusion region 60, a first source-drain terminal (e.g., one of a source or drain terminal) coupled to voltage terminal 54 (e.g., a supply voltage source), and a second source-drain terminal (e.g., the other one of the source or drain terminal) coupled pixel circuitry output path 70. A pixel output signal may be passed onto path 70. The pixel output signal may be an output signal having a magnitude that is proportional to the amount of charge at floating diffusion region 60 (e.g., corresponding to reset level charge, image level charge, etc.).

The configuration of pixel circuitry 162 shown in FIG. 5 is merely illustrative. If desired, pixel circuitry 162 in FIG. 5 may include one or more suitable additional elements, may exclude one or more suitable elements, and/or may replace one or more suitable elements. If desired, any of the voltage terminals in pixel circuitry 162 may be coupled to a variable voltage source or a fixed voltage source.

Configurations in which an image sensor pixel array such as array 20 in FIG. 3 includes pixels 22 each having the implementation of pixel circuitry 162 shown in FIG. 5 are described herein as illustrative examples. If desired, the embodiments described herein may similarly apply to an array having pixels of other implementations. In general, any suitable configuration for a lock-in pixel or any other suitable types of (indirect) TOF sensing pixels may be used.

Still referring to FIG. 5, pixel circuitry output path 70 may be a dedicated pixel output path (e.g., each pixel 22 in FIG. 3 may have its own pixel output path decoupled or separate from that of any other pixel). As such, each pixel 22 (implementing pixel circuitry 162 or another pixel configuration) may be coupled to its own dedicated readout circuitry via pixel output path 70. As shown in FIG. 5, dedicated pixel-level or per-pixel readout circuitry may include a CDS portion 172 (sometimes referred to herein as sampling circuitry 172, CDS circuitry 172, or CDS stage 172) and a storage portion 174 (sometimes referred to herein as storage circuitry 174 or storage stage 174). Pixel output path 70 for pixel circuitry 162 may be coupled to CDS circuitry 172 and may be coupled to storage circuitry 174 through CDS circuitry 172.

CDS circuitry 172 may include sampling capacitor 80 configured to sample reset level signals (voltages) and image level signals (voltages) from pixel output path 70 and store the signal at a first sampling or storage terminal of capacitor 80. Capacitor 80 may have a second terminal coupled to voltage terminal 78 (e.g., supplying a fixed voltage or a variable voltage). CDS circuitry 172 may include sample-and-hold transistor 72 (sometimes referred to herein as pixel select transistor 72) coupling pixel circuitry output path 70 to the sampling or storage terminal of sampling capacitor 80. Control signal SH may be used to selectively activate transistor 72 to sample an output signal from pixel circuitry 162 onto sampling capacitor 80. CDS circuitry 172 may include bias transistor 74 coupled to voltage terminal 76 (supplying a fixed voltage or a variable voltage signal) and configured to supply a bias current to pixel output path 70 (e.g., through transistor 72 when activated) based on control signal BIAS1 to drive the pixel output signal to CDS circuitry 172.

The sampling terminal of capacitor 80 may be capacitively coupled (via capacitor 82 in CDS circuitry 172) to a gate terminal of source follower transistor 88 in CDS circuitry 172. Source follower transistor 88 may include a first source-drain terminal coupled to voltage terminal 90 supplying any suitable fixed or variable voltage and may include a second source-drain terminal coupled to CDS signal output path 91. CDS circuitry 172 may include reset transistor 84 coupling voltage terminal 86 to the gate terminal of the source follower transistor 88. A CDS circuitry output signal may be passed onto path 91. The CDS circuitry output signal may be an output signal having a magnitude that is proportional to the amount of charge at the gate terminal of source follower transistor 88 (e.g., corresponding to a differential charge such as a differential charge between a reset level charge and image level charge).

In one illustrative mode of operation, for each image frame (e.g., associated with a corresponding phase and frequency), CDS circuitry 172 may first sample a reset level voltage from pixel circuitry 162 and subsequently an image level voltage associated with charge for the corresponding phase and frequency from pixel circuitry 162 (e.g., stored at one of storage region 46 or 56). For each of the two reset and image sampling operations, transistor 72 may be activated to pass the corresponding voltage into CDS circuitry 172 (e.g., while transistor 72 is activated to provide a bias current). Using capacitor 82 and selectively asserting transistor 84, CDS circuitry 172 may first hold a voltage at the gate terminal of transistor 88 corresponding to the reset level voltage. Thereafter, the image level voltage may be sampled onto capacitor 80, and a difference voltage between the reset level voltage and the image level voltage may result at the gate terminal of transistor 88. The CDS circuitry output signal on path 91 may corresponding to this difference voltage.

The configuration of CDS circuitry 172 shown in FIG. 5 is merely illustrative. If desired, CDS circuitry 172 in FIG. 5 may be implemented in any other suitable manners (e.g., may be implemented using any other suitable circuitry operable to perform CDS readout operations).

Still referring to FIG. 5, CDS signal output path 91 may be a dedicated CDS signal output path for pixel circuitry 162 (e.g., each pixel 22 in FIG. 3 may have its own CDS signal output path 91 decoupled or separate from that of any other pixel). As such, each pixel 22 (implementing pixel circuitry 162 or another pixel configuration) may be coupled to its own dedicated storage circuitry via pixel output path 70 and CDS signal output path 91. CDS signal output path 91 for pixel circuitry 162 may be coupled to storage circuitry 174.

Storage circuitry 174 may include a set of capacitors each configured to store a voltage corresponding to a different image frame, the combination of which may be used to perform a TOF sensing operation. In the example of FIG. 5, storage circuitry 174 includes eight such capacitors 106, 112, 118, 124, 130, 136, 142, and 148. These capacitors may be configured to store voltages for image frames associated with four different phases $\phi_1$, $\phi_2$, $\phi_3$, and $\phi_4$ and two different frequencies $f_1$ and $f_2$ (as described in connection with FIG. 4). In this particular example, capacitors 106, 112, 118, and 124 may be configured to store voltages associated with phase $\phi_0$ (i.e., at the 0-degree phase), phase $\phi_{90}$ (i.e., at the 90-degree phase), phase $\phi_{180}$ (i.e., at the 180-degree phase), and phase $\phi_{270}$ (i.e., at the 270-degree phase) for a first frequency Capacitors 130, 136, and 142, and 148 may be configured to store voltages associated with phase $\phi_0$ (i.e., at the 0-degree phase), phase $\phi_{90}$ (i.e., at the 90-degree phase), phase 4180 (i.e., at the 180-degree phase), and phase $\phi_{270}$ (i.e., at the 270-degree phase) for a second frequency $f_2$. However, this is merely illustrative. If desired, storage circuitry 174 may include any other number of such capacitors, each configured to store any corresponding voltage associated with one or more image frames.

As shown in FIG. 5, each of capacitors 106, 112, 118, 124, 130, 136, 142, and 148 may have a first terminal coupled to a voltage terminal (e.g., capacitor 106 coupled to voltage terminal 108, capacitor 112 coupled to voltage terminal 114, etc.). Each of these voltage terminals 108, 114, 120, 126, 132, 138, 144, and 150 may supply any suitable fixed voltage or variable voltage signal. Each of capacitors 106, 112, 118, 124, 130, 136, 142, and 148 may have a second terminal that stores the voltage for the image frames associated with phases and frequencies (e.g., the storage terminal of the capacitor). Each of the storage terminals of these capacitors may be coupled to a transistor that selectively provides access to the storage terminal of the corresponding capacitor (e.g., transistor 104 receiving control signal S1 may be activated to access the storage terminal of capacitor 106, transistor 110 receiving control signal S2 may be activated to access the storage terminal of capacitor 112, etc.).

Storage circuitry 174 may include store transistor 92 coupling CDS signal output path 91 one of capacitors 106, 112, 118, 124, 130, 136, 142, or 148 via the corresponding capacitor access transistors 104, 110, 116, 122, 128, 134, 140, or 146. Control signal STORE may be used to selectively activate transistor 92 to store an output signal from CDS circuitry 172 onto a corresponding storage capacitor. Storage circuitry 174 may include bias transistor 96 coupled to voltage terminal 96 (supplying a fixed voltage or a variable voltage signal) and configured to supply a bias current to CDS signal output path 91 (e.g., through transistor 92 when activated) based on control signal BIAS2 to drive the CDS circuitry output signal to storage circuitry 174.

If desired, storage circuitry 174 also include an averaging capacitor 100 having a first terminal coupled voltage terminal 102 and a second storage terminal coupled to a capacitor access transistor 98. Similar to other capacitors in storage circuitry 174, the storage terminal of averaging capacitor 100 may be accessed by activating transistors 92 and 98. Because of variance between the two charge storage regions 46 and 56 used to store the image data associated with the same phase and frequency, it may be desirable to gather the same image data with both of the two charge storage regions and average them to generate more accurate image data. The additional capacitor 100 may be configured to serve as a temporary storage node to perform such an averaging operation for each of set of image data.

An operating scheme for operating pixel circuitry 162, CDS circuitry 172, and storage circuitry 174 of FIG. 5 is described below as an illustrative example. In this example, photodiode 40 may generate image charge during a first exposure time period during which first and second portions of the generated image charge may be integrated at charge storage regions 46 and 56 (e.g., during a first integration time period). After the first integration time period, charge storage region 46 may store phase $\phi_0$ data for first frequency $f_1$, while charge storage region 56 may store phase $\phi_{180}$ data for first frequency $f_1$. These two corresponding phase data (e.g., two image level voltages) may be readout sequentially along with their corresponding reset level data using CDS circuitry 172. More explicitly, CDS circuitry 172 may readout a reset level voltage from pixel circuitry 162 first, may readout an image level voltage from pixel circuitry 162 associated with phase $\phi_0$ data for first frequency $f_1$ second, may readout another reset level voltage from pixel circuitry 162 third, and may readout an image level voltage from pixel circuitry 162 associated with phase $\phi_{180}$ data for first frequency $f_1$ fourth. In other words, CDS circuitry 172 may subtract a corresponding reset level voltage from the each of the two corresponding image data. Subsequently, storage circuitry 172 may store a voltage associated with phase $\phi_0$ data for first frequency $f_1$ at capacitor 106 and may store a voltage associated with phase 4180 data for first frequency $f_1$ at capacitor 118.

In a similar manner, during a second exposure time period, photodiode 40 may generate additional image charge integrated at charge storage regions 46 and 56 (e.g., during a second integration time period). After the second integration time period, charge storage region 46 may store phase $\phi_{90}$ data for first frequency $f_1$, while charge storage region 56 may store phase $\phi_{270}$ data for first frequency $f_1$. These two corresponding phase data (e.g., two image level voltages) may be readout sequentially along with their corresponding reset level data using CDS circuitry 172. In other words, CDS circuitry 172 may subtract a corresponding reset level voltage from the each of the two corresponding image data. Subsequently, storage circuitry 172 may store a voltage associated with phase $\phi_{90}$ data for first frequency $f_1$ at capacitor 112 and may store a voltage associated with phase $\phi_{270}$ data for first frequency $f_1$ at capacitor 124.

In order to perform the phase data averaging operation described above in connection with average capacitor 100, during yet another exposure time period, photodiode 40 may generate third image charge integrated at charge storage regions 46 and 56 (e.g., during a third integration time period). After the third integration time period, charge storage region 46 may store phase 4180 data for first frequency $f_1$, while charge storage region 56 may store phase $\phi_0$ (or equivalently $\phi_{360}$) data for first frequency $f_1$. These two corresponding phase data (e.g., two image level voltages) may be readout sequentially along with their corresponding reset level data using CDS circuitry 172. In other words, CDS circuitry 172 may subtract a corresponding reset level voltage from the each of the two corresponding image data. At this time, storage circuitry 172 may already store a voltage associated with phase $\phi_0$ data for first frequency $f_1$ (generated at charge storage region 46) at capacitor 106 and may already store a voltage associated with phase $\phi_{180}$ data for first frequency $f_1$ (generated at charge storage region 46) at capacitor 118.

It may be desirable to therefore average the voltage associated with phase $\phi_{180}$ data for first frequency $f_1$ generated at charge storage region 56 (during the first integration time period) with the voltage associated with phase $\phi_{180}$ data for first frequency $f_1$ generated at charge storage region 46 (during the third integration time period). To do this, storage circuitry 172 may first store a voltage associated with phase 4180 data for first frequency $f_1$ at averaging capacitor 100 (e.g., by asserting control signals STORE and SAVG). Therefore, transistor 92 may be deactivated, and transistors 98 and 116 may be activated (e.g., by asserting control signals SAVG and S3) to average the voltage associated with phase 4180 data for first frequency $f_1$ at capacitor 100 with the voltage associated with phase $\phi_{180}$ data for first frequency $f_1$ at capacitor 116. In a similarly manner, each of the phase $\phi_{180}$ data may separately average. This allows charge storage region variations to be canceled out.

In such a manner, following all of the CDS readout operations (e.g., subtracting a reset level voltage from a corresponding image level voltage) and following all of the averaging operations (e.g., from averaging two of the same phase data integrated at charge storage regions 46 and 56), each of capacitors 106, 112, 118, 124, 130, 136, 142, and 148 may store an averaged phase data voltage (e.g., associated with four different phases $\phi_1$, $\phi_2$, $\phi_3$, and $\phi_4$ and two different frequencies $f_1$ and $f_2$). Each of these phase data voltages may be sequentially readout from storage circuitry 174. In particular, storage circuitry 174 may include source follower transistor 152 and row select transistor 156. Source follower transistor 152 has a gate terminal coupled to each of capacitors 106, 112, 118, 124, 130, 136, 142, and 148, a first source-drain terminal coupled to voltage terminal 154 (e.g., a supply voltage source), and a second source-drain terminal coupled to row select transistor 156. Transistor 66 may have a gate terminal that is controlled by row select control signal RS. When control signal RS is asserted (e.g., during a phase data readout operation when the corresponding voltage at one of capacitors 106, 112, 118, 124, 130, 136, 142, or 148 is being read out), a phase data output signal may be passed onto path 158. The phase data output signal may be an output signal having a magnitude that is proportional to the amount of charge at the gate terminal of source follower transistor 152.

As an example, path 158 may be column line 32 in FIG. 3 and may be coupled to column readout circuitry 32 in FIG. 3. In other words, corresponding storage circuitry 174 for a plurality of pixels 22 (e.g., for a column of pixels 22) may share a single path 158 (e.g., may be couple to a sample column line 32). In such a manner, the pixel-level readout circuitry for a plurality of pixels 22 may still be coupled to column-level readout circuitry.

While pixel circuitry 162, CDS circuitry 172, and storage circuitry 174 may be implemented in any suitable manner in the sensor module, configurations in which respective pixel circuitry 162 (e.g., for pixels 22) are implemented on a first (semiconductor) substrate 160 (e.g., from a first wafer) and respective CDS circuitry 172 and storage circuitry 174 (e.g., for corresponding pixels 22) are implemented on a second (semiconductor) substrate 170 (e.g., from a second wafer) are described herein as illustrative examples. In these examples, substrates 160 and 170 may be mounted to one another, and connections between the two substrates (e.g., pixel-level pixel circuitry output paths 70 may be implemented using any suitable inter-die or stacked die connections such as pixel level hybrid bonds). In these examples, capacitors 100, 106, 112, 118, 124, 130, 136, 142, and 148 may be implemented using high-density capacitors.

The configuration of storage circuitry 174 shown in FIG. 5 is merely illustrative. If desired, storage circuitry 174 in FIG. 5 may be implemented in any other suitable manners (e.g., may be implemented using any other type of storage circuitry operable to store a plurality of phase data and/or to perform the above-mentioned averaging functions).

Figure 6:
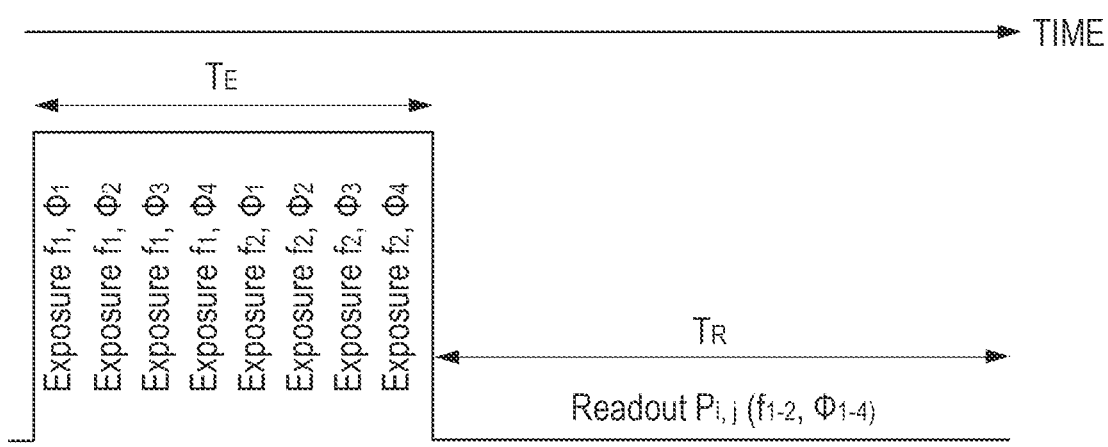
FIG. 6 is a timing diagram showing exposure time periods for image frames occurring together sequentially and readout time periods occurring together sequentially in accordance with some embodiments.

FIG. 6 is an illustrative timing diagram of showing how pixel circuitry and pixel-level readout circuitry (e.g., in the configuration described in connection with FIG. 5) may be operated during corresponding exposure and readout time periods for different sets of image frames (associated with corresponding phases and frequencies) associated with a single TOF sensing operation. In contrast to the timing diagram of FIG. 4, in FIG. 6, a continuous set of exposure time periods (collectively time period $T_E$) may occur. Only thereafter (after the end of time period $T_E$) does any readout time period occur. In other words, during time period $T_E$, pixel circuitry and pixel-level readout circuitry may generate and store corresponding phase data (associated with multiple frequencies) for each image frame sequentially. As described above in connection with FIG. 5, the phase data generated and stored during time period $T_E$ may be the result of CDS readout operations and/or averaging operations. After the generating and storing the last phase data, readout time period $T_R$ may begin to read out each of the generated and stored corresponding phase data sequentially. Put another way, pixel level readout operations may occur during time period $T_E$, while column readout operations may occur during time period $T_R$.

Figure 7:
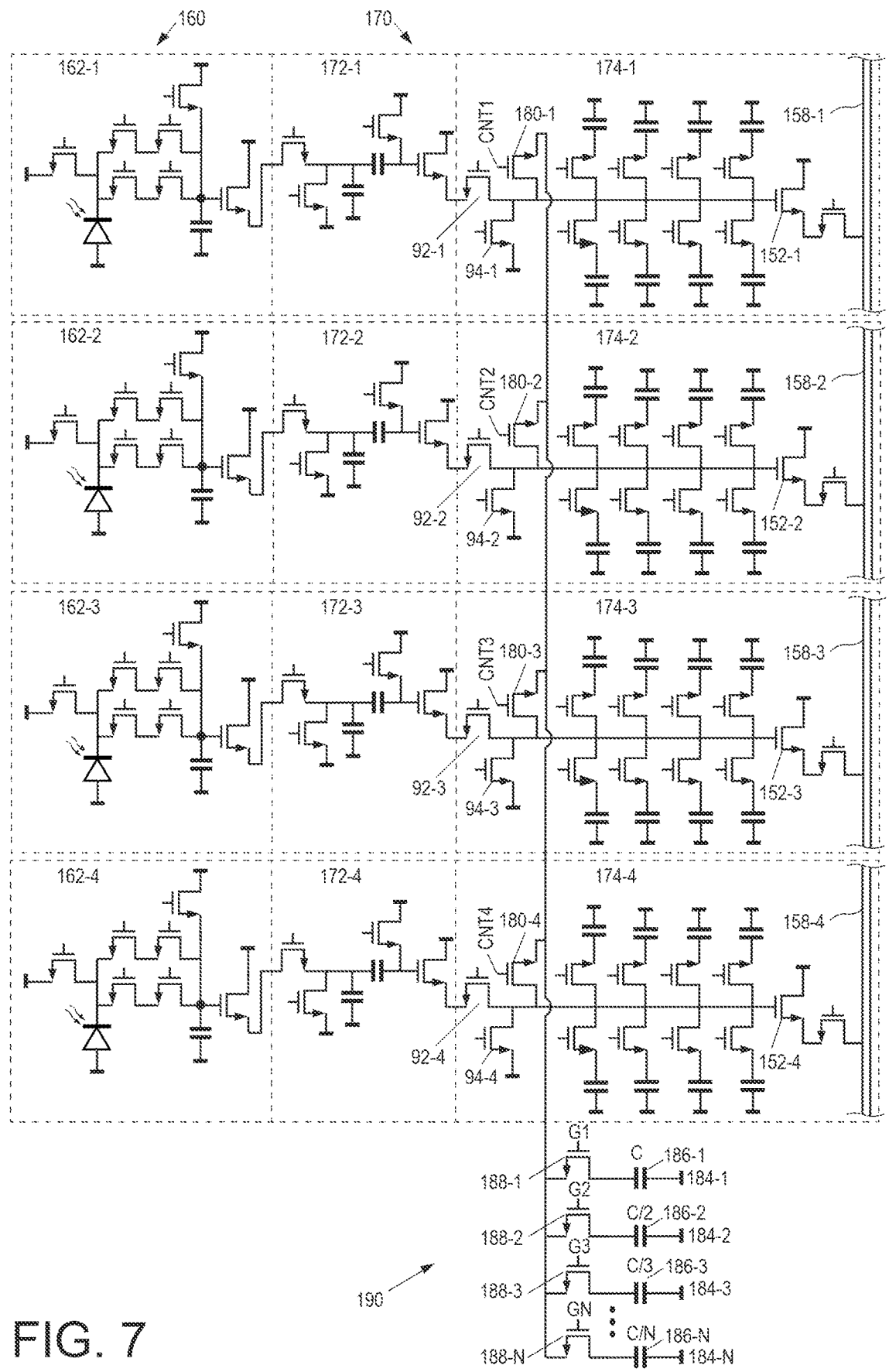
FIG. 7 is a circuit diagram of an image sensor module having pixel-level sampling and storage circuitry that is interconnected for a subarray of pixels in accordance with some embodiments.

If desired, to introduce additional functionalities to the image sensor module, the configuration of storage circuitry 174 in FIG. 5 may be modified. In particular, storage circuitry 174 for multiple pixels 22 (each implementing pixel circuitry 162) may be interconnected. FIG. 7 is an illustrative circuitry diagram of four pixels (e.g., a sub-array within the array) and respective pixel-level readout circuitry coupled to each other. The entire array may be similarly organized in a plurality of these sub-arrays. This example in FIG. 7 is merely illustrative. If desired, any suitable number of pixel and respective pixel-level readout circuitry may be interconnected to each other in a similar manner. These interconnected pixels and pixel-level readout circuitry may be arranged in any suitable manner across the pixel array (e.g., pixels and pixel-level readout circuitry in a 1-by-4, 2-by-2, 4-by-1, or any other suitable pattern may be interconnected).

As shown in FIG. 7, the four pixels 22 may include pixel circuitry 162-1, 162-2, 162-3, and 162-4, respectively, formed from a same substrate 160. Each pixel circuitry 162 may be coupled to corresponding CDS circuitry 172 (e.g., CDS circuitry 172-1, 172-2, 172-3, and 172-4), formed from a same substrate 170 (e.g., from which storage circuitry 172 is also formed). Each pixel circuitry 162 (referring to each of pixel circuitry 162-1, 162-2, 162-3, and 162-4) in FIG. 7 may have the same configuration as pixel circuitry 162 in FIG. 5, and is therefore not described in further detail in order not to unnecessarily obscure the embodiments of FIG. 7. Similarly, each CDS circuitry 172 (referring to each of CDS circuitry 172-1, 172-2, 172-3, and 172-4) in FIG. 7 may have the same configuration as CDS circuitry 172 in FIG. 5, and is not therefore not described in further detail in order not to unnecessarily obscure the embodiments of FIG. 7.

While other portions of each storage circuitry 174 (referring to each of storage circuitry 174-1, 174-2, 174-3, and 174-4) in FIG. 7 may be similar to storage circuitry 174 in FIG. 5, instead including transistor 98 providing access to averaging capacitor 100 (in FIG. 5), each CDS circuitry 174 in FIG. 7 may include a corresponding transistor 180 that provides an interconnection between corresponding pixel-level readout circuitry for the set of pixels via conductive path 182. Each transistor 180 may have a first source-drain terminal coupled to the gate terminal of transistor 152 and may have a second source-drain terminal coupled to the second source-drain terminals of other transistors 180. Therefore, when two or more transistor 180 in the set of four transistors 180 are activated (when two of the corresponding control signals CNT1, CNT2, CNT3, and CNT4 are asserted), access to any one of (eight) capacitors for different pixels may be shared and the source follower 152 for different pixels may be shared. In such a manner, different stored voltages across the four storage circuitry 174 may be shorted to each other and binned, and subsequently readout.

If desired, path 182 may also be coupled to a set of capacitors 190 (sometimes referred to herein as high dynamic range capacitor bank 190). Each of these capacitors 186 may be coupled to path 182 through a corresponding transistor 188 at a first terminal and may be coupled to a voltage terminal (supplying a fixed voltage or a variable voltage signal) at a second terminal. In other words, instead of a single averaging capacitor as described in connection with FIG. 5, a plurality of capacitors may be provided. This may help increase the dynamic range of the pixel as each of capacitors 186 may be used to store additionally charge associated (e.g., associated with the same phase data).

Figure 8:
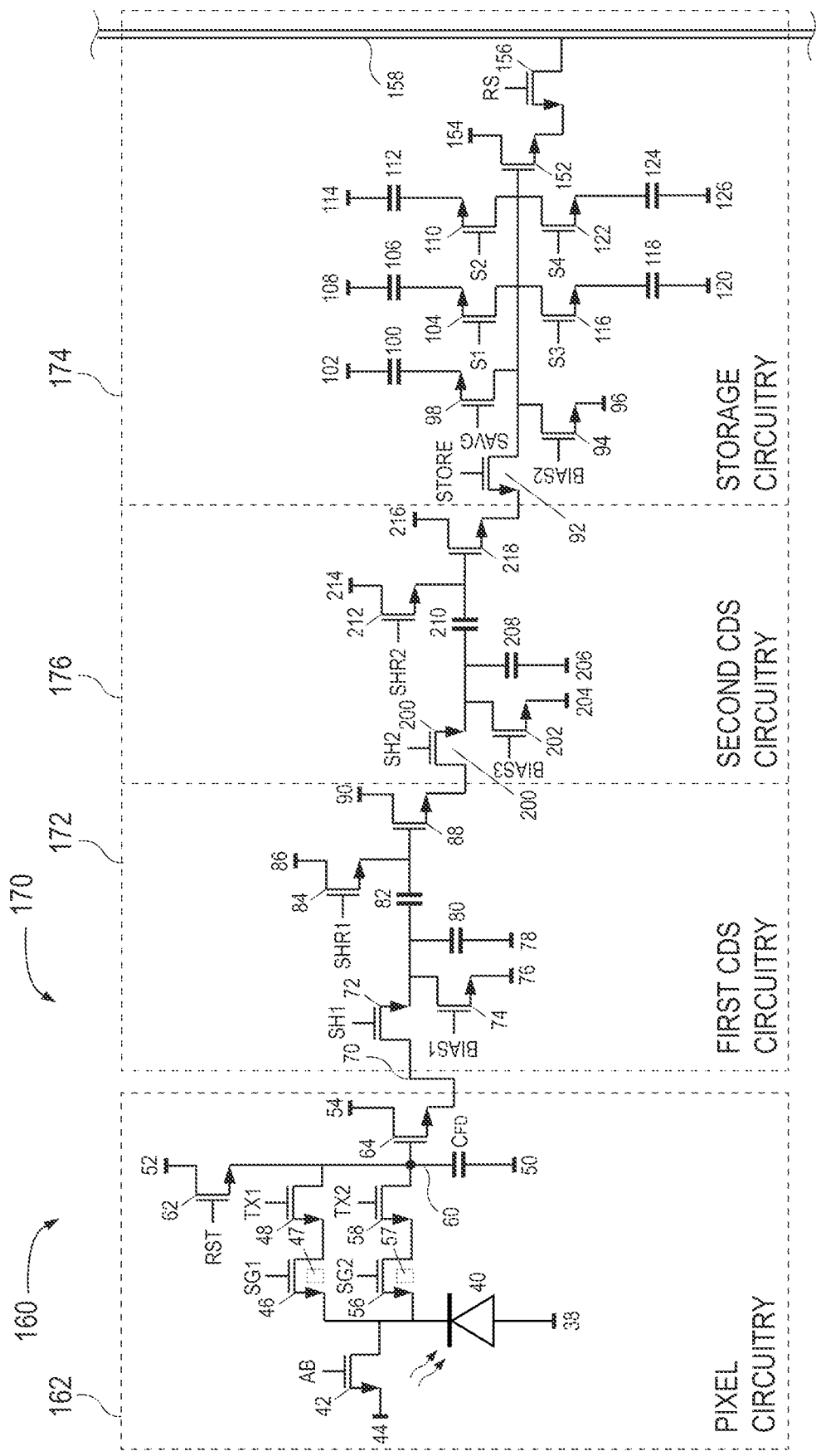
FIG. 8 is a circuit diagram of an image sensor module having pixel-level sampling and storage circuitry that include multiple sampling stages and reduced storage in accordance with some embodiments.

While FIG. 5 shows pixel-level readout circuitry having CDS circuitry 172 directly coupled to storage circuitry 174, additional CDS circuitry (or simply additional sampling circuitry) may be provided between CDS circuitry 172 and storage circuitry 174 if desired. As shown in FIG. 8, pixel-level readout circuitry may include (first) CDS circuitry 172 coupled to storage circuitry 174 via (second) CDS circuitry 176. Pixel circuitry 162 in FIG. 8 may have the same configuration as pixel circuitry 162 in FIG. 5, and is therefore not described in further detail in order not to unnecessarily obscure the embodiments of FIG. 8. Similarly, first CDS circuitry 172 in FIG. 7 may have the same configuration as CDS circuitry 172 in FIG. 5, and is not therefore not described in further detail in order not to unnecessarily obscure the embodiments of FIG. 7.

Second CDS circuitry 176 may have the same elements interconnected in the same manner as first CDS circuitry 172. However, voltage terminal 214 in second CDS circuitry 176 may supply a mid-level voltage in scenarios where voltage terminal 86 in first CDS circuitry 172 supplies a supply voltage. First CDS circuitry 172 may be configured to subtract a reset level voltage from corresponding phase data (e.g., image level voltage corresponding to the phase data). Second CDS circuitry 176 may be configured to subtract first phase data (e.g., image level voltage corresponding to the first phase data) from second complementary phase data (e.g., image level voltage corresponding to the second complementary phase data. As an example, second CDS circuitry 176 may subtract phase $\phi_0$ data from phase 4180 data to generate phase differential data second CDS circuitry output path 191. As another example, second CDs circuitry 176 may subtract phase $\phi_0$ data from phase 4180 data to generate phase differential data second CDS circuitry output path 191. In configurations where the two complementary phase data are ultimately used differentially, pixel-level circuitry including second CDS circuitry 176 does not affect the processing of phase data. Additionally, providing second CDS circuitry 176 reduces the number of phase data for each frequency from four (in the example of FIG. 5) to two (in the example of FIG. 8). As such, storage circuitry 174 in FIG. 8 may include four phase data storage capacitors 106, 112, 118, and 124 (instead of eight phase data storage capacitors in FIG. 5) and corresponding access transistors and voltage terminals for these capacitors.

Various embodiments have been described illustrating systems and methods for indirect time-of-flight (TOF) sensing using an image sensor module having pixel-level sampling and storage circuitry.

As an example, a time-of-flight (TOF) sensor may include an array of sensor pixels, each sensor pixel having a source follower transistor coupled to a pixel output path. The TOF sensor may further include per-pixel storage circuitry coupled to the pixel output path of a corresponding sensor pixel. The per-pixel storage circuitry may include a set of capacitors each configured to store different phase data generated by the corresponding sensor pixel. The TOF sensor may further include per-pixel correlated double sampling circuitry between the corresponding sensor pixel and the per-pixel storage circuitry, coupled to the pixel output path of the corresponding sensor pixel, and having a correlated double sampling circuitry output path coupled to the per-pixel storage circuitry. Analogous additional per-pixel storage circuitry may be provided for additional corresponding sensor pixels. The TOF sensor may further include column readout circuitry coupled to the per-pixel storage circuitry and the additional per-pixel storage circuitry via one or more column lines.

If desired, the TOF sensor may further include additional per-pixel correlated double sampling circuitry between the per-pixel correlated double sampling circuitry and the per-pixel storage circuitry, coupled to the correlated double sampling circuitry output path, and having an additional correlated double sampling circuitry output path coupled to the pixel-level storage circuitry. If desired, corresponding per-pixel storage circuitry for different sets of pixels in the array may be interconnected to perform binning operations on the stored voltages between the interconnected pixels. If desired, the set of corresponding per-pixel storage circuitry may be coupled to and may share a capacitor bank to extend the dynamic range of the sensor pixels.

As another example, a TOF sensing system may include pixel circuitry having pixel output path, (dedicated per-pixel) sampling circuitry coupled to the pixel output path and having a sampling circuitry output path, (dedicated per-pixel) storage circuitry coupled to the sampling circuitry output path. The storage circuitry having a plurality of capacitors and a source follower transistor coupled to a storage circuitry output path. The TOF sensing system may further include column readout circuitry coupled to the storage circuitry output path via a column line.

In some illustrative configurations, the pixel circuitry may include a photosensitive element, a floating diffusion region, and first and second charge storage regions coupled along parallel paths between the photosensitive element and the floating diffusion region. The pixel circuitry may further include a source follower transistor that couples the floating diffusion region to the pixel output path.

In some illustrative configurations, the storage circuitry may include a transistor that couples the sampling circuitry output path to each of the plurality of capacitors, and each of the plurality of capacitors may be coupled to the transistor via a corresponding access transistor. The storage circuitry may further include a source follower transistor coupling each of the plurality of capacitors to the column line via a row select transistor.

In some illustrative configuration, the sampling circuitry may include a sampling transistor that is capacitively coupled to a source follower transistor in the sampling circuitry, where the source follower transistor is coupled to the sampling circuitry output path. If desired, the pixel sampling circuitry may include a correlated double sampling stage that provides the sampling circuitry output path. If desired, the pixel sampling circuitry may include an additional correlated double sampling stage coupled in series with the correlated double sampling stage.

As yet another example, a TOF sensor module may include pixel circuitry operable to generate a set of phase data for performing a TOF sensing operation and to output the set of phase data using a pixel output path, and may include pixel-level storage circuitry (e.g., dedicated storage circuitry provided on a per-pixel basis) for the pixel circuitry and coupled to the pixel output path. The pixel-level storage circuitry may include a set of capacitors each configured to store a corresponding voltage associated with a different portion of the set of phase data. The TOF sensor module may further include readout circuitry coupled to the pixel-level storage circuitry for the pixel circuitry via a conductive path and coupled to additional pixel-level storage circuitry for additional pixel circuitry via the conductive path.

If desired, the readout circuitry may be column readout circuitry, and the conductive path may be a column line. If desired, the pixel circuitry and the pixel-level storage circuitry may be operable to sequentially store the corresponding voltages associated with the set of phase data at the set of capacitors. If desired, the readout circuitry may be operable to sequentially perform readout operations for the corresponding voltages stored at the set of capacitors. If desired, the set of phase data comprises respective portions of phase data associated with first and second different modulation frequencies. If desired, the pixel circuitry may be formed from a first substrate, and the pixel-level storage circuitry may be formed from a second substrate.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
   an array of sensor pixels;
   column readout circuitry, wherein a column of sensor pixels in the array is coupled to the column readout circuitry using a column line; and
   image data storage circuitry coupled between the column line and a source follower transistor of a given sensor pixel in the column, wherein the image data storage circuitry comprises a set of capacitors each configured to store different phase data generated by the given sensor pixel.

2. The image sensor of claim 1, wherein the image sensor is a time-of-flight sensor.

3. The image sensor of claim 1, further comprising:
   additional image data storage circuitry coupled between the column line and an additional source follower transistor of an additional sensor pixel in the column.

4. The image sensor of claim 1, wherein the set of capacitors includes a given capacitor and wherein the image data storage circuitry includes a second transistor coupled between the source follower transistor of the given sensor pixel and the given capacitor.

5. The image sensor of claim 4, wherein the image data storage circuitry includes an additional source follower transistor that couples the given capacitor to the column line.

6. The image sensor of claim 4, wherein the set of capacitors includes an additional capacitor and wherein the image data storage circuitry includes a third transistor that couples the given capacitor to the second transistor and a fourth transistor that couples the additional capacitor to the second transistor.

7. The image sensor of claim 1 further comprising:
   pixel sampling circuitry, wherein the image data storage circuitry is coupled between the pixel sampling circuitry and the column line.

8. The image sensor of claim 7, wherein the pixel sampling circuitry includes an additional source follower transistor coupled between the source follower transistor of the given sensor pixel and the image data storage circuitry.

9. An image sensor comprising:
   an array of sensor pixels;
   column readout circuitry, wherein a column of sensor pixels in the array is coupled to the column readout circuitry using a column line; and
   pixel sampling circuitry coupled between the column line and a source follower transistor of a given sensor pixel in the column, wherein the pixel sampling circuitry comprises a capacitor and a second transistor that is coupled between the source follower transistor of the given sensor pixel and the capacitor.

10. The image sensor of claim 9, wherein the pixel sampling circuitry comprises a correlated double sampling stage between the column line and the source follower transistor and wherein the correlated double sampling stage is formed at least in part by the capacitor and the second transistor.

11. The image sensor of claim 10 further comprising:
    a storage stage between the correlated double sampling stage and the column line.

12. The image sensor of claim 10, wherein the pixel sampling circuitry comprises an additional correlated double sampling stage between the correlated double sampling stage and the column line.

13. The image sensor of claim 9, wherein the pixel sampling circuitry comprises an additional source follower transistor coupled between the capacitor and the column line.

14. The image sensor of claim 9, wherein the image sensor is a time-of-flight sensor.

15. An image sensor comprising:
pixel circuitry forming a plurality of sensor pixels;
per-pixel sampling circuitry for each sensor pixel in the plurality of sensor pixels;
per-pixel storage circuitry for each sensor pixel in the plurality of sensor pixels; and
a plurality of transistors each between the per-pixel sampling circuitry and the per-pixel storage circuitry of a corresponding sensor pixel in the plurality of sensor pixels.

16. The image sensor of claim 15, further comprising:
readout circuitry, wherein the plurality of sensor pixels are coupled to the readout circuitry using a conductive line and wherein the per-pixel storage circuitry of each sensor pixel in the plurality of sensor pixels is coupled to the conductive line.

17. The image sensor of claim 15, wherein the pixel circuitry is on a first substrate and at least one of the per-pixel sampling circuitry or the per-pixel storage circuitry is formed on a second substrate.

18. The image sensor of claim 15, wherein the per-pixel storage circuitry for each sensor pixel in the plurality of sensor pixels comprises a set of capacitors each coupled to a corresponding transistor of the plurality of transistors.

19. The image sensor defined in claim 15, wherein the per-pixel sampling circuitry for each sensor pixel in the plurality of sensor pixels comprises a source follower transistor coupled to a corresponding transistor of the plurality of transistors.

20. The image sensor defined in claim 15, wherein the per-pixel storage circuitry for each sensor pixel in the plurality of sensor pixels comprises a source follower transistor coupled to a corresponding transistor of the plurality of transistors.

\* \* \* \* \*